United States Patent [19]

Takanashi et al.

[11] Patent Number: 4,890,124

[45] Date of Patent: Dec. 26, 1989

[54] PRINTING APPARATUS UTILIZING AN ELECTRIC FIELD APPLIED BETWEEN A CHARGE STORAGE LAYER ON A TRANSFER DRUM AND A PHOTOCONDUCTIVE LAYER MEMBER

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka, all of Japan

[73] Assignee: Victor Company of Japan, Ltd., Yokohama, Japan

[21] Appl. No.: 300,879

[22] Filed: Jan. 23, 1989

[30] Foreign Application Priority Data

Jan. 22, 1988 [JP] Japan ................................ 63-12336

[51] Int. Cl.⁴ ............................................ G01D 17/00

[52] U.S. Cl. ................................ 346/160; 346/160.1

[58] Field of Search .................. 346/160, 107 R, 108, 346/154, 160.1; 358/300, 302

[56] References Cited

U.S. PATENT DOCUMENTS 4,803,565 2/1989 Teshigawara et al. ............ 346/160

4,831,408 5/1989 Yoshikawa ........................ 346/160

*Primary Examiner*—Arthur G. Evans

*Attorney, Agent, or Firm*—Lowe, Price, LeBlanc, Becker & Shur

[57] ABSTRACT

In a printing apparatus, there are provided a transfer drum having a charge storage layer and an electrode provided on one side thereof, a printing head having a photoconductive layer provided at the other side thereof, a transparent electrode provided on the photoconductive layer such that the photoconductive layer and the charge storage layer are interposed between the transparent electrode and the electrode, a beam applying device for applying a constant laser beam to the photoconductive layer from a side of the transparent electrode, a printing signal applying device for applying a printing signal between the transparent electrode and the electrode, developing device for developing the charge pattern, and photographic fixing device for fixing the developed charge pattern on a piece of paper. Since the charge storage layer on a transfer drum is provided apart from the photoconductive layer, the laser printer has a simple structure, and can be presented with low cost.

9 Claims, 4 Drawing Sheets

PRINTING APPARATUS UTILIZING AN ELECTRIC FIELD APPLIED BETWEEN A CHARGE STORAGE LAYER ON A TRANSFER DRUM AND A PHOTOCONDUCTIVE LAYER MEMBER

BACKGROUND OF THE INVENTION

1. Field of the Invention

This invention relates generally to printing apparatus for recording letters and/or pictures on a printing medium, and particularly to laser printers for achieving high-resolution images.

2. Prior Art

Recently, various types of laser printers are generally used for recording images. In those conventional laser printers, a photosensitive drum on which a photoconductive layer is provided is used, and a laser beam is applied to the photosensitive drum.

However, since the photoconductive layer is functioned as a photosensitive member, a charging mechanism using a high voltage portion is provided therein, and the photoconductive layer has to be provided on the circumference of the photosensitive drum. Therefore, there are disadvantages that the structure of laser printers becomes complicate and expensive, and that a dangerous high voltage generator exists therein.

SUMMARY OF THE INVENTION

The present invention has been developed in order to remove the above-described drawbacks inherent to the conventional laser printers.

It is, therefore, an object of the present invention to provide a new and useful printing apparatus utilizing an electric field generated between a charge storage layer on a transfer drum and a photoconductive layer member provided apart from the transfer drum.

It is another object of the invention to provide a laser printer having a simple structure.

It is a further object of the invention to provide a laser printer which can be presented with low cost.

In accordance with the present invention there is provided a printing apparatus comprising: a transfer member for receiving a charge pattern including: a charge storage layer member for storing the charge pattern; and an electrode provided on one side of the charge storage layer member; a printing head including: a photoconductive layer member provided at the other side of the charge storage layer member; a transparent electrode provided on the photoconductive layer member such that the charge storage layer member and the photoconductive layer member are interposed between the electrode and the transparent electrode; and beam applying means for applying a constant laser beam to the photoconductive layer member from a side of the transparent electrode, the printing head being moved so as to scan on the transfer member; printing signal applying means for applying a printing signal between the transparent electrode and the electrode; developing means for developing the charge pattern; and photographic fixing means for fixing the developed charge pattern on a printing medium.

In accordance with the present invention there is also provided a printing apparatus comprising: a transfer member for receiving a charge pattern including: a charge storage layer member for storing the charge pattern; and an electrode provided on one side of the charge storage layer member; a printing head including: a photoconductive layer member provided at the other side of the charge storage layer member; and a transparent electrode provided on the photoconductive layer member such that the charge storage layer member and the photoconductive layer member are interposed between the electrode and the transparent electrode; printing signal applying means for applying a printing signal between the transparent electrode and the electrode; beam applying and scanning means for applying a constant laser beam to the photoconductive layer member from a side of the transparent electrode such that the constant laser beam scans thereon; developing means for developing the charge pattern; and photographic fixing means for fixing the developed charge pattern on a printing medium.

In accordance with the present invention there is further provided a printing apparatus comprising: a transfer member for receiving a charge pattern including: a charge storage layer member for storing the charge pattern; and an electrode provided on one side of the charge storage layer member; a printing head including: a photoconductive layer member provided at the other side of the charge storage layer member; and a transparent electrode provided on the photoconductive layer member such that the charge storage layer member and the photoconductive layer member are interposed between the electrode and the transparent electrode; voltage signal applying means for applying a constant voltage signal between the transparent electrode and the electrode, the voltage signal applying means having a switching means for switching the voltage signal; beam applying and scanning means for applying a laser beam to the photoconductive layer member from a side of the transparent electrode such that the laser beam scans thereon; printing signal applying means for applying a printing signal to the beam applying means such that intensity of the laser beam is modulated in accordance with the printing signal; developing means for developing the charge pattern; and photographic fixing means for fixing the developed charge pattern on a printing medium.

In accordance with the present invention there is still further provided a printing apparatus comprising: a transfer member for receiving a charge pattern including: a charge storage layer member for storing the charge pattern; and an electrode provided on one side of the charge storage layer member; a printing head including: a photoconductive layer member provided at the other side of the charge storage layer member; and a transparent electrode provided on the photoconductive layer member such that the charge storage layer member and the photoconductive layer member are interposed between the electrode and the transparent electrode; beam applying and scanning means for applying a laser beam to the photoconductive layer member from a side of the transparent electrode, the beam applying and scanning means being moved such that the laser beam scans thereon; voltage signal applying means for applying a constant voltage signal between the transparent electrode and the electrode, the voltage signal applying means having a switching means for switching the voltage signal; printing signal applying means for applying a printing signal to the beam applying means such that intensity of the laser beam is modulated in accordance with the printing signal; developing means for developing the charge pattern; and photographic fixing means for fixing the developed charge pattern on a printing medium.

In accordance with the present invention there is still further provided a printing apparatus comprising: a transfer member for receiving a charge pattern including: a charge storage layer member for storing the charge pattern; and an electrode provided on one side of the charge storage layer member; a printing head including: a photoconductive layer member provided at the other side of the charge storage layer member; and a transparent electrode provided on the photoconductive layer member such that the charge storage layer member and the photoconductive layer member are interposed between the electrode and the transparent electrode; beam applying and scanning means for applying a laser beam to the photoconductive layer member from a side of the transparent electrode such that the laser beam scans thereon, the beam applying and scanning means having: a charge pattern storage means for storing a charge pattern of a printing image; and a charge pattern-to-optical image converting means for converting the charge pattern into the printing image; voltage signal applying means for applying a constant voltage signal between the transparent electrode and the electrode, the voltage signal applying means having a switching means for switching the voltage signal; printing signal applying means for applying a printing signal to the beam applying means such that intensity of the laser beam is modulated in accordance with the printing signal; developing means for developing the charge pattern; and photographic fixing means for fixing the developed charge pattern on a printing medium.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
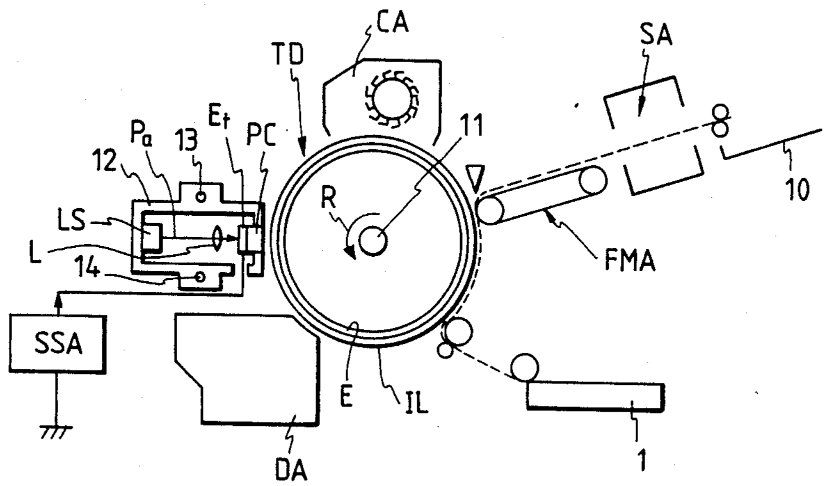
FIG. 1 is a side elevational view showing a structure of a printer of a first embodiment according to the present invention.

With reference to FIG. 1, a printing apparatus of a first embodiment according to the present invention generally comprises a developing device DA, a cleaning device CA, a photographic fixing device SA, a carrying device FMA, a paper applying device 1, a tray 10, a transfer drum TD, a rotational shaft 11, a laser beam source LS, a condencer lens L, a photoconductive layer member PC, a transparent electrode Et, and electrode E, a charge storage layer member IL, a printing signal source SSA, a frame 12 of a printing head, and guide shafts 13 and 14 for making the printing head movable in parallel to the rotational shaft 11 with an interval between the printing head and the surface of the transfer drum TD being kept constantly. The developing device DA, the cleaning device CA, the photographic fixing device SA, the carrying device FMA, the paper applying device 1, and the tray 10 can be used by the same parts as that of conventional electric copying machines. The transfer drum TD is provided with a transfer member including the electrode E and the charge storage layer member IL. The electrode E is provided on an entire surface of the transfer drum TD, and the charge storage layer member IL is provided on the electrode E. The transfer drum TD is rotated in the direction of an arrow R at a certain rotational speed. Although the charge storage layer member IL is made of an insulating material, polymeric materials such as silicone resin and acrylate resin can be also used. The photoconductive layer member PC and the transparent electrode Et are formed as one body, and the photoconductive layer member PC is faced the charge storage layer member IL. The laser beam source LS, the condencer lens L, and the photoconductive layer member PC and transparent electrode Et are provided in the frame 12 of the printing head.

In the present invention printer, charge patterns such as letters and shapes are found on the surface of the charge storage layer member IL of the transfer member, and are transfered to a sheet of recording paper by developing with a toner which is a very fine synthetic powder.

Figure 3:
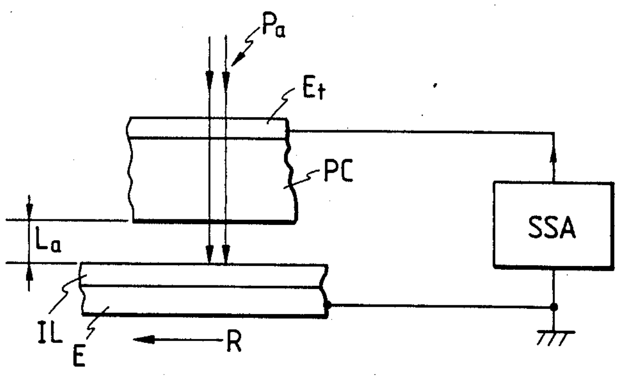
FIG. 3 is a drawing for describing a principle of the printer of the present invention.

Here, prior to describing the preferred embodiments of the present invention, the principle of the printing apparatus of the present invention will be described hereinbelow with reference to FIG. 3. In FIG. 3, the photoconductive layer member PC faces the charge storage layer member IL of the transfer member at an interval La, and the interval La may be zero.

First, when a beam Pa having a constant beam-intensity is applied to the photoconductive layer member PC from a side of the transparent electrode Et, and when the printing signal source SSA is connected between the transparent electrode Et and the electrode E for applying a voltage signal as a printing signal thereto in accordance with the signal from the printing signal source SSA, a resistance value of a beamed portion in the photoconductive layer member PC is made constant. Then, since the laser beam Pa is applied on the photoconductive layer member PC as an extremely small point, or very small diameter beam, the resistance value of only the portion of such a fine beamed point on the photoconductive layer member PC is changed to lower resistance value. Meanwhile, since such a printing voltage signal from the printing signal source SSA is supplied between the transparent electrode Et and the electrode E as described before, an electric potential at the beamed fine point on the photoconductive layer member PC is made higher than another portion on the photoconductive layer member PC. Therefore, electric field intensity between the beamed fine point on the photoconductive layer member PC and a surface of the charge storage layer member IL of the transfer member is made larger than another portion on the charge storage layer member IL. As a result, only such a charge storage layer member fine portion corresponding to the beamed portion of the photoconductive layer member PC is charged by an electric discharge in accordance with the electric potential on the photoconductive layer member PC. Thus, the charge amount in the charge storage layer member IL corresponds to the voltage signal outputted from the printing signal source SSA. For example, if the printing signal source SSA outputs a digital signal, the charge amount in the charge storage layer member IL is changed as a digital value on a time axis, and if the printing signal source SSA outputs an analog signal, the charge amount in the charge storage layer member IL is changed as an analog value on the time axis.

Then; the incident place of the laser beam PA is moved relatively to the transfer member, and therefore, a charge pattern is formed on the surface of the charge storage layer member IL in accordance with the voltage signal outputted from the printing signal source SSA. The above-mentioned principle is applied to printers shown in FIGS. 1 and 4.

Second, when the beam-intensity of the laser beam PA is modulated by the voltage signal outputted from the printing signal source SSA, and when a constant voltage is applied between the transparent electrode Et and the electrode E, a resistance value of a beamed portion in the photoconductive layer member PC changes in accordance with the beam-intensity of the laser beam Pa which is applied thereto via the transparent electrode Et as a fine point. Then, since the constant voltage is applied between the transparent electrode Et and the electrode E as described before, a resistance value at the beamed fine point on the photoconductive layer member PC is made lower than another portion on the photoconductive layer member PC in accordance with the beam-intensity of the laser beam Pa, and an electric potential at the beamed fine point on the photoconductive layer member PC is made higher than another portion on the photoconductive layer member PC. Therefore, electric field intensity between the beamed fine point on the photoconductive layer member PC and a surface of the charge storage layer member IL of the transfer member is made larger than another portion on the charge storage layer member IL. As a result, only such a charge storage layer member fine portion corresponding to the beamed portion of the photoconductive layer member PC is charged by an electric discharge in accordance with the electric potential on the photoconductive layer member PC. Thus, the charge amount in the charge storage layer member IL corresponds to the voltage signal outputted from the printing signal source SSA because the beam-intensity of the laser beam Pa is modulated by the voltage signal outputted from the printing signal source SSA. For example, if the printing signal source SSA outputs a digital signal, the charge amount in the charge storage layer member IL is changed as a digital value on a time axis, and if the printing signal source SSA outputs an analog signal, the charge amount in the charge storage layer member IL is changed as an analog value on the time axis.

In the case that a constant voltage is applied between the transparent electrode Et and the electrode E, since the charge storage layer member IL is charged by utilizing the beam-intensity of the laser beam Pa, if such a potential difference between the transparent electrode Et and the electrode E is not made zero, the charge on the surface of the photoconductive layer member PC is remained, thereby influencing the subsequent print. Therefore, it is required that the constant voltage between the transparent electrode Et and the electrode E is switched at an interval between a printing period and the following printing period. The above-mentioned principle is applied to printers shown in FIGS. 5,6, and 8.

Figure 2:
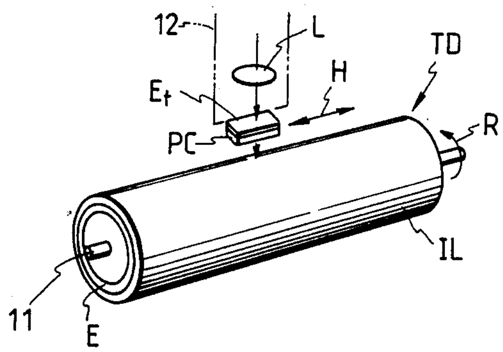
FIG. 2 is a drawing for describing an operation of the printer of the present invention.

The operation of the first embodiment printer will be described hereinbelow with reference to FIGS. 1 and 2. When the printer starts a print operation, the frame 12 of the printing head including the photoconductive layer member PC is moved by means of the guide shafts 13 and 14 in parallel to the rotational shaft 11 of the transfer drum TD. i.e. in the direction of H (see FIG.2), with an interval being kept between the surface of the transfer member on the transfer drum TD and the surface of the photoconductive layer member PC provided in the printing head. Then, the incident position of laser beam Pa is also moved with the frame 12, i.e. the printing head in the frame 12 is moved so as to scan on the electrode of the transfer member. In other words, beamed fine point produced by the laser beam Pa performs a main scan by moving in parallel to the rotational shaft 11, and performs a sub-scan in relation to the rotation of the TD. As a result, by the operational principle described before, a charge pattern corresponding to the printing voltage signal applied between the transparent electrode Et and the electrode E is formed on the charge storage layer member IL by the main scan and sub-scan.

The charge pattern on the charge storage layer member IL is transferred to a printing medium like a piece of paper sent from the paper applying device 1 after the charge pattern is made visible by a toner in the developing device DA, and is photographically fixed in the photographic fixing device SA with the paper being carried by the carrying device FMA. Accordingly, a desired printing image visibly fixed on the paper is obtained in the tray 10. After this, the remaining toner is cleaned in the cleaning device CA for the subsequent print operation. In addition, a piece of paper, in which a coloring degree is changed in accordance with the charge amount, can be also used in the above-mentioned operation.

Figure 4:
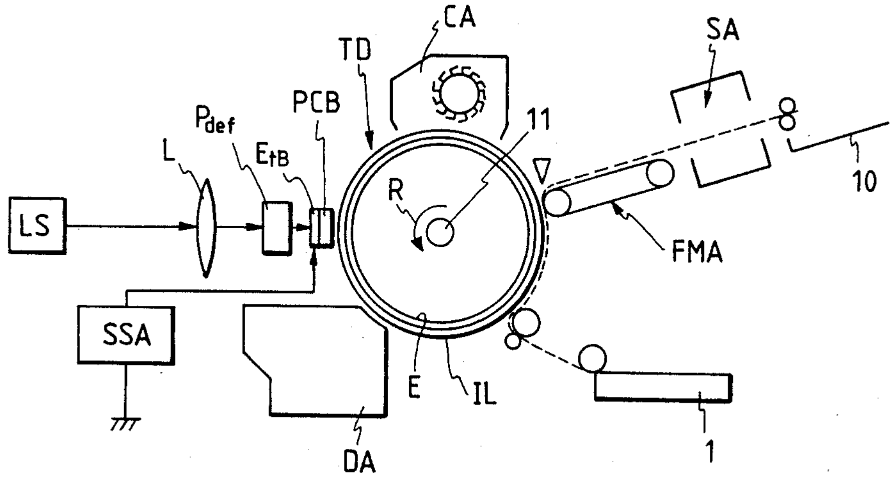
FIG. 4 is a side elevational view showing a structure of a printer of a second embodiment according to the present invention.
Figure 7:
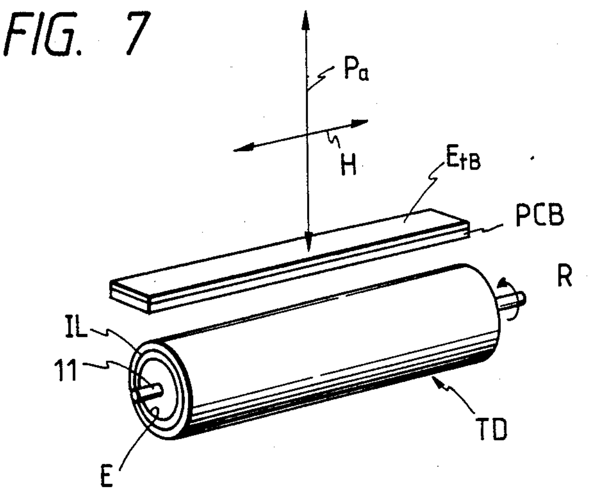
FIG. 7 is a drawing for describing an operation of the printer of the present invention.

FIG. 4 shows a second embodiment printer of the invention. The structure of the printer of FIG. 4 is the same as FIG. 1 except that a photoconductive layer member PCB and a transparent electrode EtB are provided, and an optical deflector Pdef is provided between the condencer lens L and the transparent electrode EtB of the printing head. The laser beam Pa scans on the photoconductive layer member PCB by means of the optical deflector Pdef. Those parts which are the same as those in FIG. 1 are designated at the same numerals and description thereof is omitted. The length of the photoconductive layer member PCB in the main scan direction, or in parallel to the rotational shaft 11, is equal or more than that of the transfer member in parallel to the rotational shaft 11 as shown in FIG. 7. In other words, only the laser beam Pa is shifted so as to scan on the photoconductive layer member PCB from the side of the transparent electrode EtB. In this case, the photoconductive layer member PCB and the transparent electrode EtB are operated as a printing head, and the laser source LS, the condencer lens L, and the optical deflector Pdef are operated as beam applying and scanning means.

Figure 5:
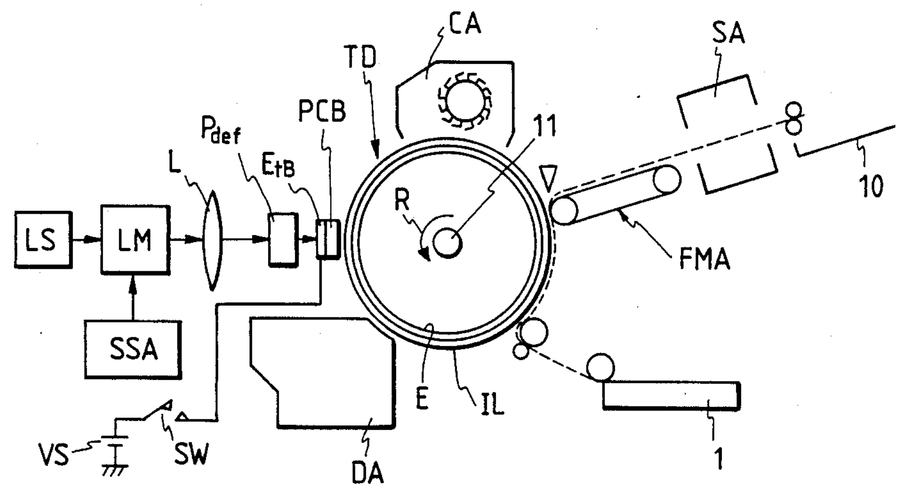
FIG. 5 is a side elevational view showing a structure of a printer of a third embodiment according to the present invention.

FIG. 5 shows a third embodiment printer of the invention. The structure of the printer of FIG. 5 is the same as FIG. 4 except that a printing signal outputted from the printing signal source SSA is applied to an optical modulator LM, and that a voltage source VS is applied to the transparent electrode EtB via a switch SW for resetting the difference voltage between the transparent electrode EtB and the electrode E as described before. Those parts which are the same as those in FIG. 4 are designated at the same numerals and description thereof is omitted. In this embodiment, the printing voltage signal outputted from the printing signal source SSA is applied to the optical modulator LM for modulating the laser beam Pa in accordance with this printing voltage signal. The switch SW is determined to an ON state when the laser beam Pa performs a main scan for a printing operation, and is determined to an OFF state when the laser beam Pa moves in the main scan direction for the time period that any printing operation is not required, whereby a potential difference between the transparent electrode EtB and the electrode E is determined to zero for avoiding an influence to the subsequent print.

Figure 6:
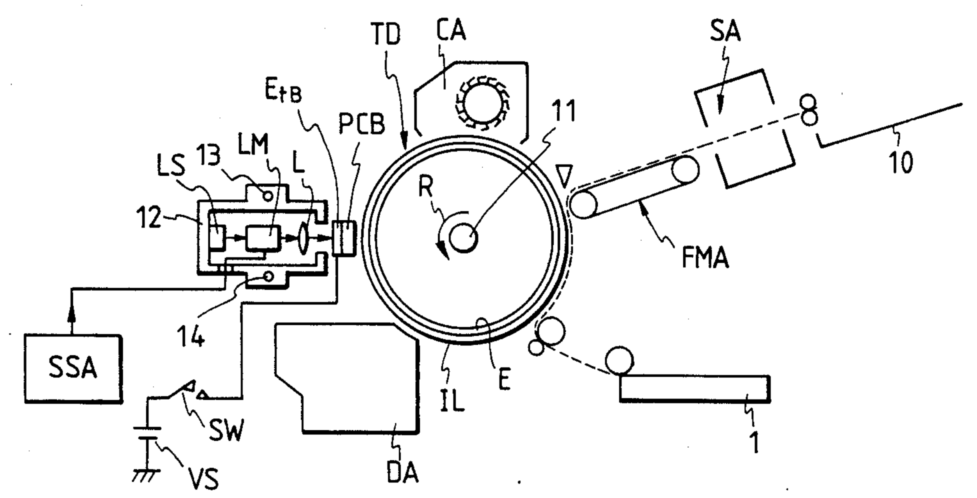
FIG. 6 is a side elevational view showing a structure of a printer of a fourth embodiment according to the present invention.

FIG. 6 shows a fourth embodiment printer of the invention. The structure of the printer of FIG. 6 is the same as FIG. 5 except that the optical deflector Pdef is not provided, and the laser beam source LS, the condencer lens L, and the optical modulator LM are provided in the frame 12. Those parts which are the same as those in FIGS. 1 and 5 are designated at the same numerals and description thereof is omitted.

Figure 8:
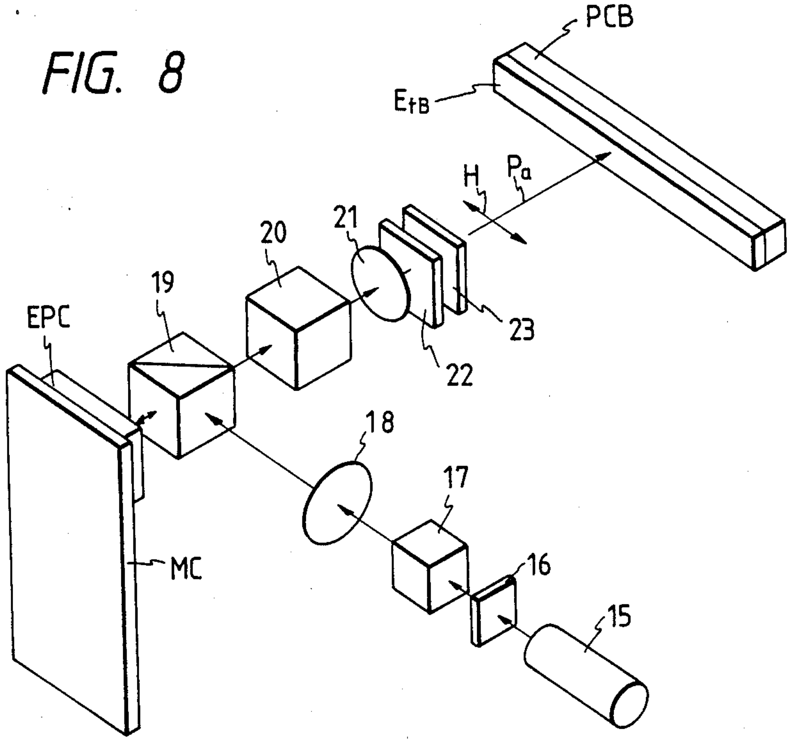
FIG. 8 is a side elevational view showing a structure of a printer of a fifth embodiment according to the present invention.

FIG. 8 shows a fifth embodiment printer of the invention. In FIG. 8, a printing signal source means generally includes a light source 15, a polarizer 16, an optical deflector 17, a collimating lens 18, a beam splitter 19, an optical deflector 20, a beam condenser 21, a wave plate 22, an analizer 23, a charge pattern storage device MC for storing printing information as a charge pattern, and a charge pattern-to-optical image converting device EPC for converting a charge pattern into an optical image. The charge pattern storage device MC is made of an insulating material, and the charge pattern is stored therein for a long time. One of charge pattern forming methods is disclosed in Japanese Laid-Open patent application No. 62-206917.

The converting device EPC is made of a beam modulating layer material in which a dielectric mirror is provided at the one side of a lithium niobate layer having a electrooptical effect or of a nematic liquid crystal layer, and in which a transparent electrode is provided the other side thereof, for example. When a charge pattern is applied to the converting device EPC from the dielectric mirror side, and when the beam is applied from the transparent electrode side, such an applied beam reflects at the dielectric mirror via the beam modulating layer material. Then, a polarizing angle of the reflection beam from the beam modulating layer material is changed in accordance with the incident beam.

In the fifth embodiment, light generated from the light source 15 is changed to a beam by the polarizer 16, and the beam is applied to the optical deflector 17. In the optical deflector 17, the beam is deflected in the transversal and longitudinal directions. After this: the beam from the optical deflector 17 is applied to the beam splitter 19 via the collimating lens 18. Such an incident beam into the splitter 19 is applied to the converting device EPC. Since a charge pattern forming surface of a charge pattern storage device MC is attached to the dielectric mirror side of the converting device EPC, the beam reflects at the dielectric mirror via the beam modulating layer material as described above. Here, the rotational amount of a deflection surface in the converting device EPC is changed in accordance with the charge amount of the charge pattern stored in the charge pattern storage device MC. Subsequently, the beam outputted from the converting device EPC is applied to the optical deflector 20. In the optical deflector 20, incident beam is deflected in only the horizontal direction, and applied to the beam condencer lens 21. Such a condenced beam is applied to the photoconductive layer member PC as a beam Pa via the wave plate 22, the analizer 23, and the transparent electrode EtB. Thus, the charge pattern stored in the charge pattern storage device MC is formed on the surface of the photoconductive layer member PC by the main scan of the modulated beam Pa. This structure of the fifth embodiment can be applied to that of another embodiment described above.

In the above-mentioned printers of the invention, print is achieved by utilizing not only electric signals from the printing signal source but also charge pattern in the charge pattern storage device MC, and a printer having a resolution of 1000 lines/mm can be applied with low cost. Although the transfer drum TD is used in the present invention, a transfer plate member is applied thereto.

The above-described embodiments are just examples of the present invention, and therefore, it will be apparent for those skilled in the art that many modifications and variations may be made without departing from the scope of the present invention.

What is claimed is:

1. A printing apparatus comprising:

(a) a transfer member for receiving a charge pattern including:
  (i) a charge storage layer member for storing said charge pattern; and
  (ii) an electrode provided on one side of said charge storage layer member;
(b) a printing head including:
  (i) a photoconductive layer member provided at the other side of said charge storage layer member;
  (ii) a transparent electrode provided on said photoconductive layer member such that said charge storage layer member and said photoconductive layer member are interposed between said electrode and said transparent electrode; ;and
  (iii) beam applying means for applying a constant laser beam to said photoconductive layer member from a side of said transparent electrode, said printing head being moved so as to scan on said transfer member;
(c) printing signal applying means for applying a printing signal between said transparent electrode and said electrode;
(d) developing means for developing said charge pattern; and
(e) photographic fixing means for fixing said developed charge pattern on a printing medium.

2. A printing apparatus comprising:

(a) a transfer member for receiving a charge pattern including:

(i) a charge storage layer member for storing said charge pattern; and (ii) an electrode provided on one side of said charge storage layer member;

(b) a printing head including:

(i) a photoconductive layer member provided at the other side of said charge storage layer member; and (ii) a transparent electrode provided on said photoconductive layer member such that said charge storage layer member and said photoconductive layer member are interposed between said electrode and said transparent electrode;

(c) printing signal applying means for applying a printing signal between said transparent electrode and said electrode;

(d) beam applying and scanning means for applying a constant laser beam to said photoconductive layer member from a side of said transparent electrode such that said constant laser beam scans thereon;

(e) developing means for developing said charge pattern; and (f) photographic fixing means for fixing said developed charge pattern on a printing medium.

3. A printing apparatus as claimed in claim 2, wherein said transfer member is formed on a transfer drum having a rotational shaft, the length of said photoconductive layer member in parallel to said rotational shaft being equal or more than that of said transfer drum in parallel to said rotational shaft.

4. A printing apparatus comprising:

(a) a transfer member for receiving a charge pattern including:

(i) a charge storage layer member for storing said charge pattern; and (ii) an electrode provided on one side of said charge storage layer member;

(b) a printing head including:

(i) photoconductive layer member provided at the other side of said charge storage layer member; and (ii) a transparent electrode provided on said photoconductive layer member such that said charge storage layer member and said photoconductive layer member are interposed between said electrode and said transparent electrode;

(c) voltage signal applying means for applying a constant voltage signal between said transparent electrode and said electrode, said voltage signal applying means having a switching means for switching said voltage signal;

(d) beam applying and scanning means for applying a laser beam to said photoconductive layer member from a side of said transparent electrode such that said laser beam scans thereon;

(e) printing signal applying means for applying a printing signal to said beam applying means such that intensity of said laser beam is modulated in accordance with said printing signal;

(f) developing means for developing said charge pattern; and (g) photographic fixing means for fixing said developed charge pattern on a printing medium.

5. A printing apparatus as claimed in claim 4, wherein said transfer member is formed on a transfer drum having a rotational shaft, the length of said photoconductive layer member in parallel to said rotational shaft being equal or more than that of said transfer drum in parallel to said rotational shaft.

6. A printing apparatus comprising:

(a) a transfer member for receiving a charge pattern including:

(i) a charge storage layer member for storing said charge pattern; and (ii) an electrode provided on one side of said charge storage layer member;

(b) a printing head including:

(i) a photoconductive layer member provided at the other side of said charge storage layer member; and (ii) a transparent electrode provided on said photoconductive layer member such that said charge storage layer member and said photoconductive layer member are interposed between said electrode and said transparent electrode;

(c) beam applying and scanning means for applying a laser beam to said photoconductive layer member from a side of said transparent electrode, said beam applying and scanning means being moved such that said laser beam scans thereon;

(d) voltage signal applying means for applying a constant voltage signal between said transparent electrode and said electrode, said voltage signal applying means having a switching means for switching said voltage signal;

(e) printing signal applying means for applying a printing signal to said beam applying means such that intensity of said laser beam is modulated in accordance with said printing signal;

(f) developing means for developing said charge pattern; and (g) photographic fixing means for fixing said developed charge pattern on a printing medium.

7. A printing apparatus as claimed in claim 6, wherein said transfer member is formed on a transfer drum having a rotational shaft, the length of said photoconductive layer member in parallel to said rotational shaft being equal or more than that of said transfer drum in parallel to said rotational shaft.

8. A printing apparatus comprising:

(a) a transfer member for receiving a charge pattern including:

(i) a charge storage layer member for storing said charge pattern; and (ii) an electrode provided on one side of said charge storage layer member;

(b) a printing head including:

(i) a photoconductive layer member provided at the other side of said charge storage layer member; and (ii) a transparent electrode provided on said photoconductive layer member such that said charge storage layer member and said photoconductive layer member are interposed between said electrode and said transparent electrode;

(c) beam applying and scanning means for applying a laser beam to said photoconductive layer member from a side of said transparent electrode such that said laser beam scans thereon, said beam applying and scanning means having:

(i) a charge pattern storage means for storing a charge pattern of a printing image; and (ii) a charge pattern-to-optical image converting means for converting said charge pattern into said printing image;

(d) voltage signal applying means for applying a constant voltage signal between said transparent electrode and said electrode, said voltage signal applying means having a switching means for switching said voltage signal;

(e) printing signal applying means for applying a printing signal to said beam applying means such that intensity of said laser beam is modulated in accordance with said printing signal;

(f) developing means for developing said charge pattern; and (g) photographic fixing means for fixing said developed charge pattern on a printing medium.

9. A printing apparatus as claimed in claim 8, wherein said transfer member is formed on a transfer drum having a rotational shaft, the length of said photoconductive layer member in parallel to said rotational shaft being equal or more than that of said transfer drum in parallel to said rotational shaft.

* * * * *